(12) United States Patent
Spry et al.

(10) Patent No.: US 7,779,188 B2
(45) Date of Patent: Aug. 17, 2010

(54) SYSTEM AND METHOD TO REDUCE MEMORY LATENCY IN MICROPROCESSOR SYSTEMS CONNECTED WITH A BUS

(75) Inventors: Bryan L. Spry, Portland, OR (US); Harris D. Joyce, Portland, OR (US); Balaji P. Ramamoorthy, Beaverton, OR (US); Jeffrey D. Gilbert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 18 days.

(21) Appl. No.: 11/087,914

(22) Filed: Mar. 22, 2005

(65) Prior Publication Data

US 2006/0218334 A1 Sep. 28, 2006

(51) Int. Cl.
*G06F 13/00* (2006.01)
(52) U.S. Cl. .................................. 710/112; 710/310
(58) Field of Classification Search .................. 710/107, 710/112, 113, 305–306, 309–310
See application file for complete search history.

(56) References Cited

U.S. PATENT DOCUMENTS 5,615,343 A 3/1997 Sarangdhar et al.
5,937,171 A 8/1999 Sarangdhar et al.
6,009,488 A 12/1999 Kavipurapu
6,260,091 B1 * 7/2001 Jayakumar et al. .......... 710/113
RE38,388 E * 1/2004 Sarangdhar et al. ......... 710/105

OTHER PUBLICATIONS

Office Action received for Taiwanese Patent Application No. 95109464, mailed on Feb. 27, 2009, 32 pages inclusive of English Translation.
Office Action received for Taiwanese Patent Application No. 95109464, mailed on Oct. 8, 2009, 20 pages inclusive of English Translation.

* cited by examiner

*Primary Examiner*—Clifford H Knoll
(74) *Attorney, Agent, or Firm*—Caven & Aghevli LLC (57) ABSTRACT

A system and method for signaling a deferred response to a data request in a bus connected system is described. In one embodiment, a responding agent on the bus issues a deferred response message when it cannot supply the requested data in a short period of time. When the responding agent knows that the requested data will shortly arrive in its buffers, it may first send an identification signal to the requesting agent, indicating to the requesting agent that it should prepare to receive the data shortly. After one or more bus clock cycles, the responding agent may then subsequently send the corresponding data message to the requesting agent.

24 Claims, 6 Drawing Sheets

FIG. 6 ically to microprocessor systems, and more specifically to microprocessor systems that may use an interconnecting bus that supports delayed data transfers.

SYSTEM AND METHOD TO REDUCE MEMORY LATENCY IN MICROPROCESSOR SYSTEMS CONNECTED WITH A BUS

The present invention relates generally to microprocessor systems, and more specifically to microprocessor systems that may use an interconnecting bus that supports delayed data transfers.

BACKGROUND

Microprocessor systems may use various forms of busses to exchange data. It is convenient to generically label the various functional elements of the system that are connected to the bus, such as processors, memory controllers, input/output controllers, or chipsets, as bus "agents". In a simplified bus system, a requesting agent may send a request message over the bus, and a responding agent with the requested data may respond with a data message to the requesting agent. In such a simplified bus design, the bus would stay in an idle state after the issuance of the request message until the corresponding data message was sent. When a long-latency operation occurs, such as a responding agent having to fetch data from a system memory, the idle state could occupy a significant period of time. Such idle states would therefore not permit efficient use of the limited bus bandwidth.

In order to avoid the use of such idle states on the bus, various bus designs have been implemented that permit other bus transactions to occupy the time periods between a data request message and the corresponding data message. One such bus design has used what is sometimes referred to in the technical literature as an "enhanced defer protocol". In this protocol, when the responding agent will not gain access to the requested data in a short period of time, it quickly issues a deferred response message. This deferred response message indicates to the requesting agent that the request was correctly received but that the responding agent does not yet have the data. Then when the responding agent does receive the data, it may arbitrate for the bus and then send concurrently an identification signal and a data signal. The identification signal and data signal, arriving together, give the data requested and also logically connect it to the correct pending request.

For further details of a bus implementing an enhanced defer protocol, see U.S. Pat. No. 6,012,118 to Muthurajan Jayakumar, et al, which issued on 4 Jan. 2000.

BRIEF DESCRIPTION OF THE DRAWINGS

The present disclosure is illustrated by way of example, and not by way of limitation, in the figures of the accompanying drawings and in which like reference numerals refer to similar elements and in which.

DETAILED DESCRIPTION

The following description includes techniques for signaling the imminent arrival of data previously requested by a requesting agent on a bus. In the following description, numerous specific details such as logic implementations, software module allocation, bus and other interface signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments, the invention is disclosed in the environment of a Pentium® compatible processor system (such as those produced by Intel® Corporation) and the associated system and processor firmware. However, the invention may be practiced with other kinds of processor systems, such as with an Itanium® Processor Family compatible processor (such as those produced by Intel® Corporation), an X-Scale® family compatible processor, or any of a wide variety of different general-purpose processors from any of the processor architectures of other vendors or designers. Additionally, some embodiments may include or may be special purpose processors, such as graphics, network, image, communications, or any other known or otherwise available type of processor in connection with its firmware.

Figure 1:
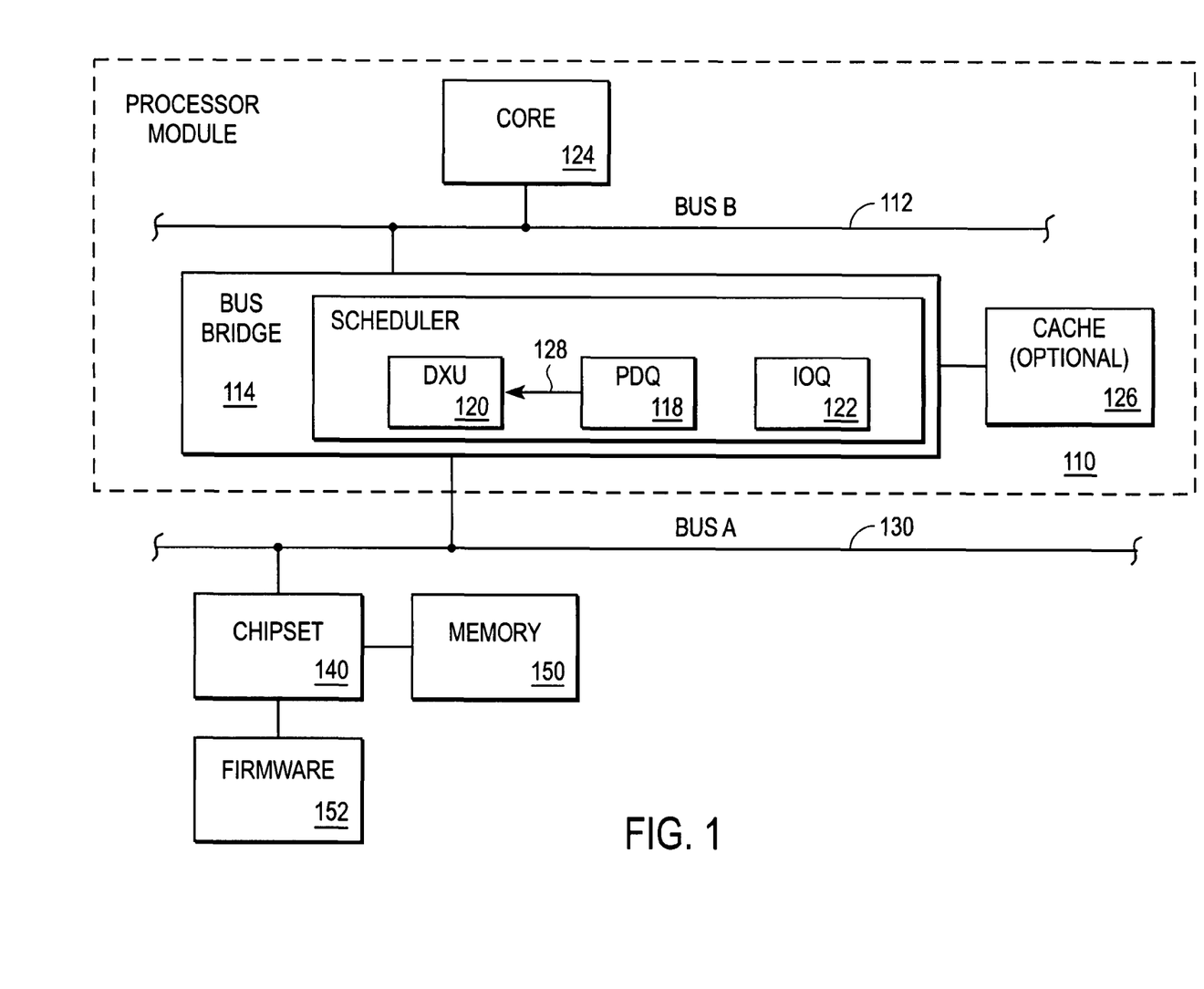
FIG. 1 is a system diagram of agents connected via a bus, according to one embodiment of the present disclosure.

Referring now to FIG. 1, a system diagram of agents connected via a bus A is shown, according to one embodiment of the present disclosure. An agent is a circuit which may participate in data exchange over a bus A. Examples of such agents may be processors, input/output controllers, memory controller, or chipsets (sometimes combinations of input/output and memory controllers). FIG. 1 shows a bus A 130 which may be used to exchange data between agents. In one embodiment, bus A 130 is a bus of the present disclosure. Two agents, processor module 110 and chipset 140, are shown, but in other embodiments there may be other agents present. The use of memory controller logic within chipset 140 permits processor module 110 to load and store data from and to system memory 150 and firmware 152.

Processor module 110 may include several circuits. There may be one or more processor cores 124 for processing data and requesting memory transfers. A secondary bus B 112 may be used to exchange data between one or more processor cores 124 and a bus bridge 114. In one embodiment secondary bus B 112 may be of conventional, enhanced defer protocol, design. In other embodiments, there may be several secondary busses connected to bus bridge 114, where each of several cores of processor module 110 (such as core 124) may have a dedicated connection to bus bridge 114. In one embodiment, bus bridge 114 may serve as an agent on both bus A 130 and bus B 112.

Bus bridge 114 may include a scheduler 118 to schedule and track data transfers in both directions between bus A 130 and bus B 112. Scheduler 116 may include several logic functions to aid in this process of scheduling and tracking. In one embodiment, scheduler 118 may include an in-order queue (IOQ) 122, a pending data queue (PDQ) 118, and a data exchange unit (DXU) 120. The IOQ 122 may include entries corresponding to all transactions involving the processor module 110 which are in process on bus A 130. The PDQ 118 may include entries corresponding to all deferred transactions involving the processor module 110 which are in process on bus A 130, and may control the receipt of any data into the DXU 120 when the deferred transactions deliver any data that is associated with them.

As an example, consider a data read operation initiated by core 124. A data request message may be issued by core 124 over secondary bus B 112 to bus bridge 114. (The details of this part of the transaction are not discussed in detail because they are not significant to the operation of bus A 130. In other embodiments, bus B 112 may be another kind of bus entirely, or may be replaced by one or more point-to-point links.) The bus bridge 114 may then issue a corresponding data request message over bus A 130 to chipset 140. When this occurs, the scheduler 114 may make an entry in IOQ 122 to track the transaction in process.

Unless the chipset 140 may immediately service the data request message received over bus A 130, it may send a deferred reply message, indicating that the data request was received and understood but that the actual data requested will be sent at a later, unspecified, time. This deferred reply message may cross bus A 130 and enter the scheduler 116 of bus bridge 114. The scheduler 116 may then make an entry in PDQ 118 which indicates that an identification (and potentially a snoop results delivery) message, and optionally a data delivery message, may be expected at some time in the future. The bus bridge 114 may then pass a corresponding deferred reply message across bus B 112 to the requesting core 124.

Chipset 140 is closely connected to system memory 150, and it is expected that it may know either by design or by prediction when the requested data will be available in advance of the data's actual arrival in the chipset. For this reason, in one embodiment the chipset may send the identification message in advance of the time that it sends the actual data message. In one embodiment, the identification message may be sent a small number of bus clock cycles ahead of the actual data message. (In contrast, conventional enhanced deferred protocol busses would send the identification message and begin the corresponding actual data message during the same bus clock cycle.)

When the chipset 140 sends the identification message, the scheduler 116 may match it to the corresponding entry in PDQ 118. However, the corresponding entry in PDQ 118 will not be as the corresponding data message has not yet arrived. PDQ 118 may however initialize DXU 120 to receive the data message when it arrives. In one embodiment, PDQ 118 may use two sets of pointers and associated logic to allocate an entry in the DXU 120 for the future data message. PDQ 118 may also generate various data transfer control signals 128 to direct the DXU 120 to capture the data message. Generally a PDQ 118 may include various other forms of information such as the transaction identification, data buffer identification, critical chunk for data burst ordering on the bus, the length of the data transfer, and any other information needed to complete the transaction. In some embodiments, an optional cache 126 may be included, and the data message may be temporarily stored in the cache 126.

Additionally, when the chipset 140 sends the identification message, the scheduler 116 may then begin the arbitration process for the use of secondary bus B 112. In this manner bus B 112 may become initialized for the transfer of the data message from the bus bridge 114 to the core 124 before the actual data message arrives in the scheduler 116. In other embodiments without a secondary bus B 112 other forms of initialization for the receipt of the data message could be used.

When the data arrives into the chipset 140 from system memory 150, the chipset may then send it as a data message over bus A 130. Since the identification message has already been received in PDQ 118 and since DXU 120 has been prepared to receive it, the data message may be placed into DXU 120 under the control of the PDQ 118. In other embodiments, other forms of data buffering may be used, and these data buffers may be initialized by the identification message.

Once the data message has been stored in DXU 120, it may be sent over bus B 112 to the core 124. Since the arbitration by bus bridge 114 for the use of bus B 112 has already begun, the data message may be sent to core 124 at an earlier time than if the arbitration had begun at a time when the identification message had been delayed to arrive at the same time as the data message.

In one embodiment, DXU 120 would store the data messages corresponding to identification messages in the order in which the identification messages arrived. This would impose a restriction on the bus protocol of bus A 130 that other data messages could not be sent between a particular identification message and its corresponding identification message. In other embodiments, such interleaving could be accommodated using additional messages or signals.

Figure 2:
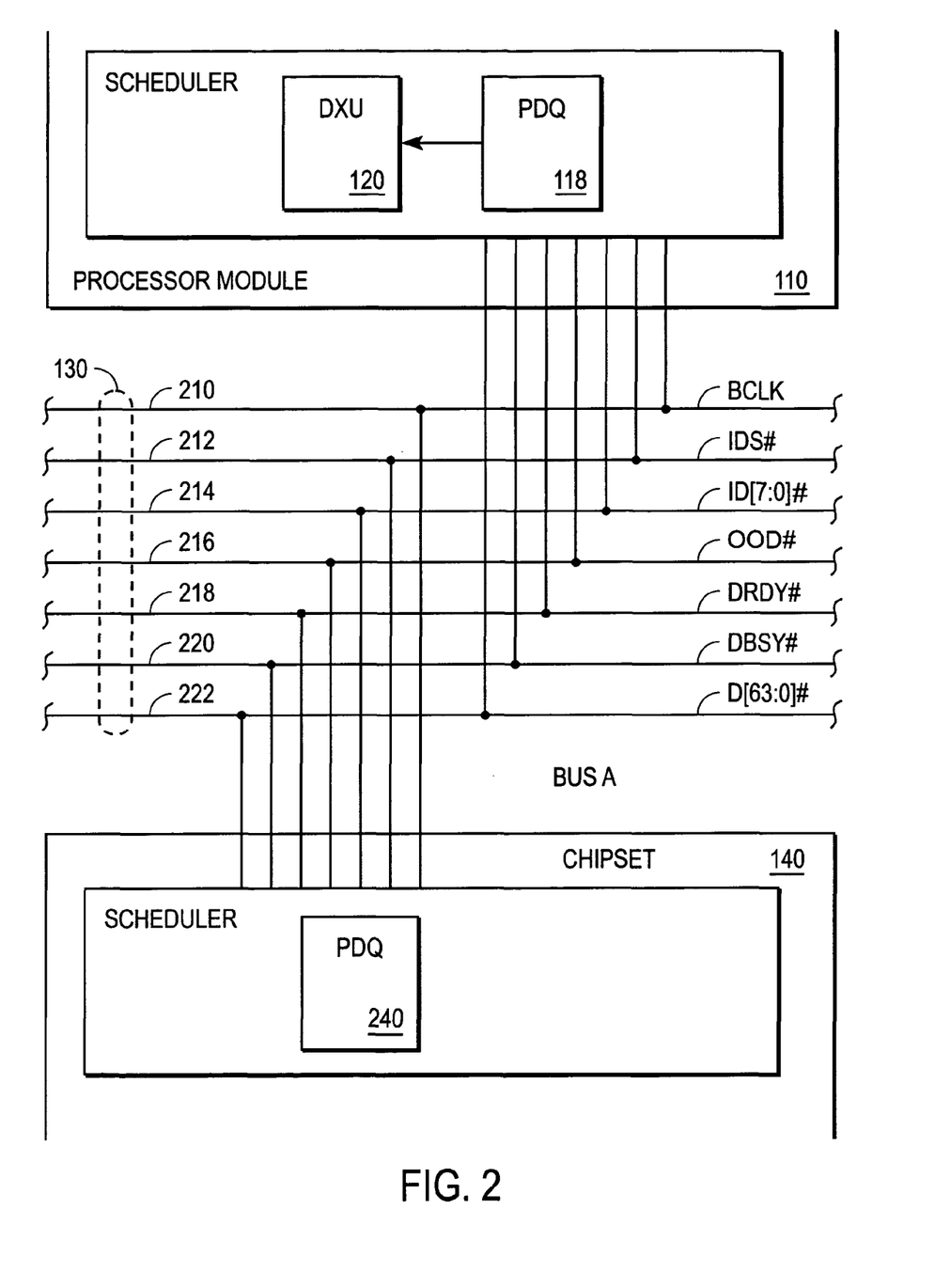
FIG. 2 is a detail diagram of agents connected via a bus, according to one embodiment of the present disclosure.

Referring now to FIG. 2, a detail diagram of agents connected via a bus is shown, according to one embodiment of the present disclosure. In this embodiment, bus A 130 may include a bus clock signal BCLK 210, a identification strobe signal IDS# 212, several identification data bits ID[7:0]# 214, a data strobe OOD# 216, a data ready strobe DRDY# 218, a data busy strobe DBSY# 220, and several data message data bits D[63:0]# 222. Here a signal followed by a pound sign (#) indicates a signal with negative true logic. In other embodiments, positive logic could be used. Bus clock signal BCLK 210, identification strobe signal IDS# 212, identification data bits ID[7:0]# 214, data ready strobe DRDY# 218, data busy strobe DBSY# 220, and data message data bits D[63:0]# 222 are generally present in conventional enhanced deferred protocol busses and have functions that are well-known in the art. Other signals may be required to implement bus A 130 but are not shown for clarity. For example, in one embodiment error correcting code (ECC) signals carried on signals DEWP[7:]# (not shown) may be used to increase the reliability of data conveyed on data message data bits D[63:0]# 222. In other embodiments, more or fewer than 8 identification data bits may be used, and more or fewer than 64 data message data bits may be used. In other embodiments, other groups of signals could be used to form a bus or other form of interconnect.

In the FIG. 2 bus, IDS# 212 may be used to indicate that the identification signal carried on identification data bits ID[7:0]# 214 is ready to be sampled. In a conventional bus, where the identification message would be sent during the same bus clock cycle of BCLK 210 as the data message, IDS# 212 could also be used to indicate when data message data on data message data bits D[63:0]# 222 is ready to be sampled. However in one embodiment the data message may arrive one or more clock periods of BCLK 210 after the identification message. Therefore in one embodiment an additional signal, OOD# 216, may be used to indicate when data message data on data message data bits D[63:0]# 222 is ready to be sampled. The OOD# 216 signal is not present in conventional enhanced deferred protocol busses.

Figure 3:
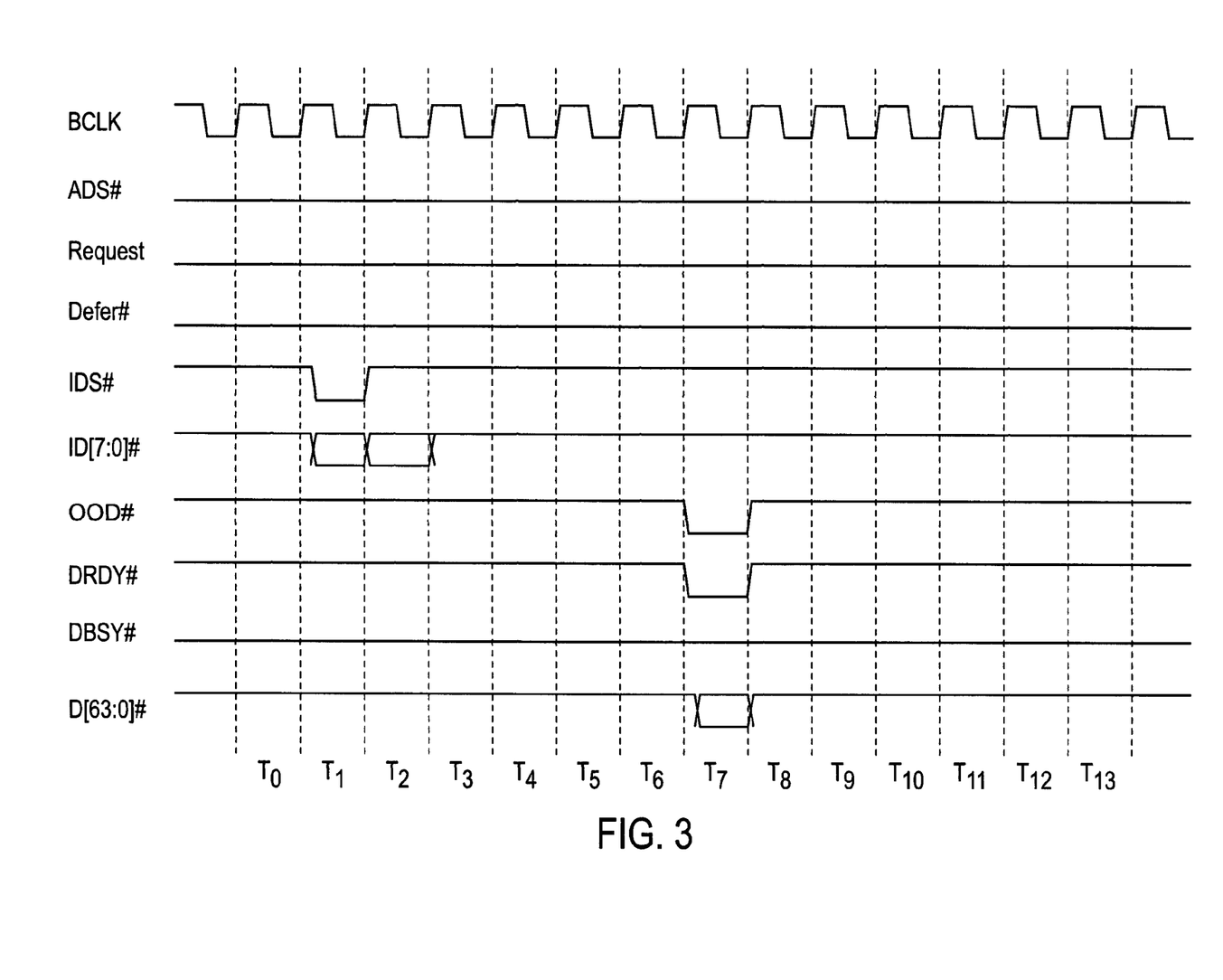
FIG. 3 is a timing diagram of a single data word arriving multiple clock cycles after an identification signal, according to an embodiment of the present disclosure.

Referring now to FIG. 3, a timing diagram of a single data word arriving multiple clock cycles after an identification signal is shown, according to an embodiment of the present disclosure. The situation in FIG. 3 is subsequent to a responding bus agent having sent a deferred response message to the requesting bus agent. At T1, signal IDS# goes active, indicating that the identification signal carried on identification data bits ID[7:0]# is ready to be sampled. The identification signal present on identification data bits ID[7:0]# may then be read during time period T1. An optional snoop results word present on identification data bits ID[7:0]# may, if present, be read during time period T2. Time intervals t3 through T6 may, in one embodiment, present an overlap interval where a secondary bus prepares to receive data while a chipset on the FIG. 3 bus.

The time intervals of the bus clock during T7 and T8 may represent the data delivery phase of the deferred transaction. When OOD# goes active, it indicates the beginning of the data phase of the deferred transaction. Six clock cycles after IDS# goes active, during time period T7, signal OOD# goes active, indicating that data message data for the deferred response, identified at time T1, is available to be sampled on data message data bits D[63:0]#. In other embodiments, the OOD# may go active more than six or fewer than six clock cycles after IDS# is asserted. Also at this time DRDY# indicates a general data ready signal. DBSY# does not need to go active because what is shown in FIG. 3 is a single-word data transfer. During a single-word data transfer, the responding agent does not need to take ownership of the bus.

It is noteworthy that in practice there may occur interleaved data transfers, where there may be several assertions of IDS# before the corresponding data from each assertion of IDS#, and the corresponding assertions of OOD#, are sent. In one embodiment the identification signals (occurring with IDS#) may be correlated with the data (occurring with OOD#) by treating them as being in the same order. This order may be determined by examining the entries in a buffer such as the PDQ 118 of FIG. 1 above.

Figure 4:
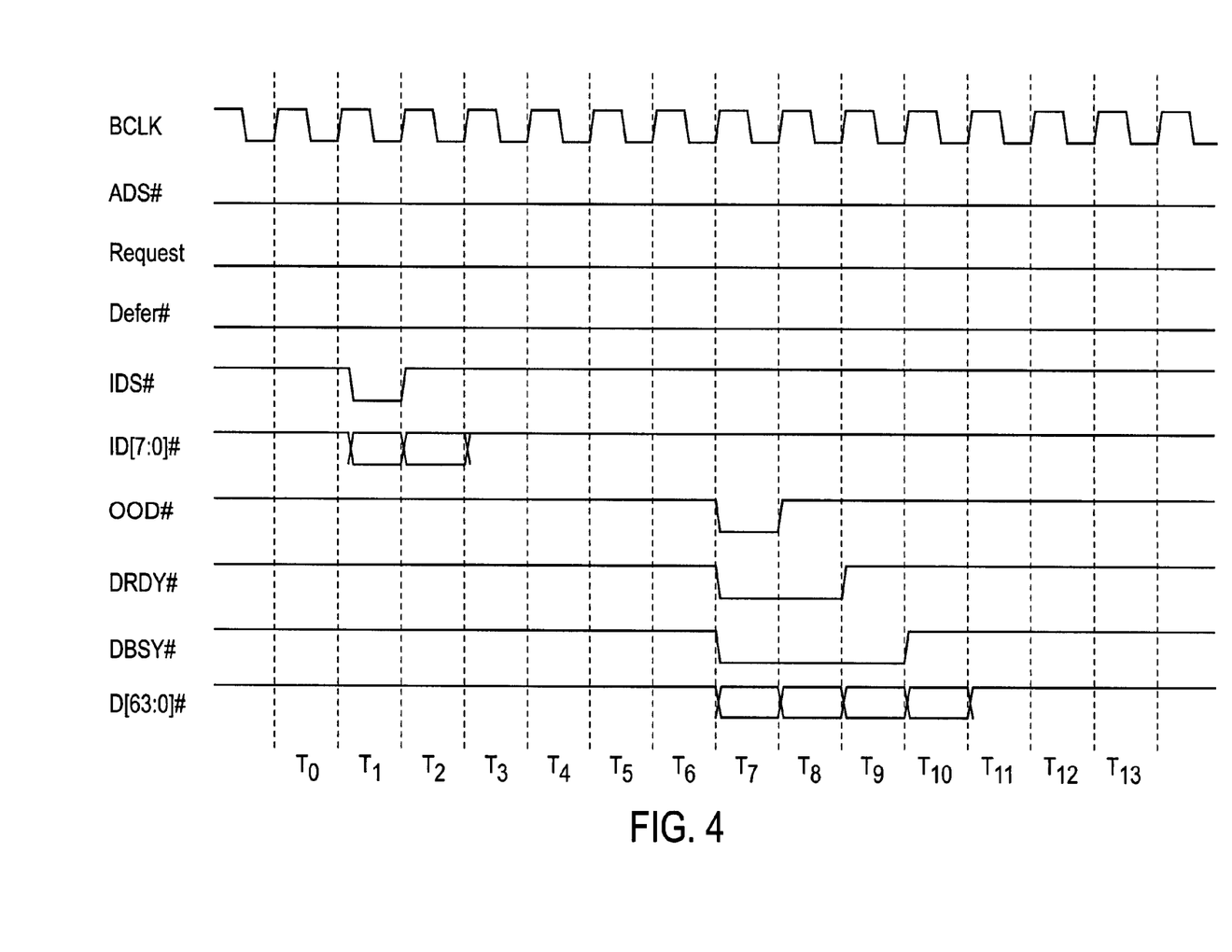
FIG. 4 is a timing diagram of several data words arriving multiple clock cycles after an identification signal, according to another embodiment of the present disclosure.

Referring now to FIG. 4, a timing diagram of several data words arriving multiple clock cycles after an identification signal is shown, according to another embodiment of the present disclosure. The situation in FIG. 4 is subsequent to a responding bus agent having sent a deferred response message to the requesting bus agent. At T1, signal IDS# goes active, indicating that the identification signal carried on identification data bits ID[7:0]# is ready to be sampled. The identification signal present on identification data bits ID[7:0]# may then be read during time period T1. An optional snoop results word present on identification data bits ID[7:0]# may, if present, be read during time period T2. Time intervals t3 through T6 may, in one embodiment, present an overlap interval where a secondary bus prepares to receive data while a chipset on the FIG. 4 bus.

The time intervals of the bus clock during T7, T8, T9, and T10 may represent the data delivery phase of the deferred transaction. Six clock cycles after IDS# goes active, during time period T7, signal OOD# goes active, indicating that first data word of the data message data for the deferred response, identified at time T1, is available to be sampled on data message data bits D[63:0]#. Also at this time DRDY# indicates a general data ready signal. DBSY# goes active because what is shown in FIG. 4 is a multiple-word data transfer. DBSY# goes active during the time periods T7 through T9, indicating that the responding agent has ownership of the bus from T7 through T10—one bus clock cycle after DBSY# is de-asserted.

Figure 5:
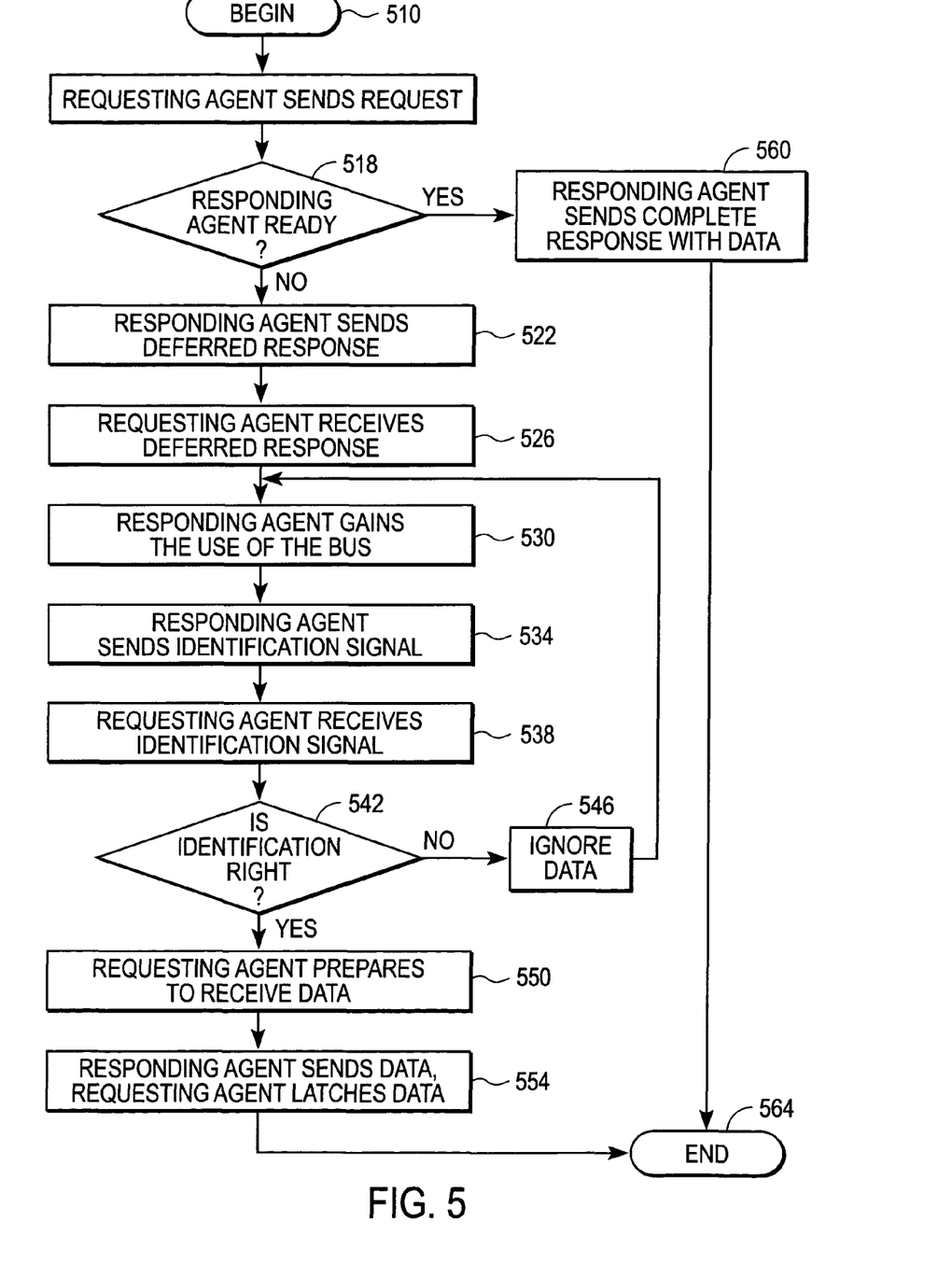
FIG. 5 is a flowchart of a method of sending an identification signal before sending the corresponding data signal, according to an embodiment of the present disclosure.

Referring now to FIG. 5, a flowchart of a method of sending an identification signal before sending the corresponding data signal is shown, according to an embodiment of the present disclosure. In block 514, the requesting agent sends a request for data out over the bus. In one embodiment, this request originated internally to the requesting agent, which could be a processor or other kind of agent. In other embodiments, this request may have originated externally to the requesting agent, which could be a bus bridge or other kind of agent.

In decision block 518, the responding agent may determine whether it is ready to respond to the data request without much delay. If so, then it exits along the YES path, and in block 560 it sends the requested data to the requesting agent. This ends the transaction. However, if the responding agent is not ready to respond to the data request, then the process exits along the NO path.

In block 522, the responding agent may send a deferred response message over the bus to the requesting agent. This deferred response message may indicate that the requested data will be sent along at a later period in time. When the requesting agent receives the deferred response message (in block 526), it may take action in several ways. In one embodiment, an entry may be created in a pending data queue. In this manner, the requesting agent may track those requests that it issued for which it has not yet received the corresponding data.

When, either by design or by prediction, the responding agent determines that the requested data is due to arrive from the memory or other source, in block 530 the responding agent gains the use of the bus, either by arbitration or because it still retains ownership of the bus from before. Then in block 534 the responding agent sends an identification signal over the bus to the requesting agent.

In block 538 the requesting agent receives the identification signal. It then may take several actions depending upon the contents of the identification signal. In decision block 542 the requesting agent may determine whether the identification signal matches one of the entries in the pending data queue. If not, then the process exits via the NO path, and in block 546 the requesting agent ignores any data placed upon the bus subsequent to the identification signal. The process then returns to wait for another action in block 530.

If, however, in decision block 542 the requesting agent determines that the identification signal does match one of the entries in the pending data queue, then the process exits via the YES path. In block 550 the requesting agent may prepare to receive the data signal. In one embodiment, this may include setting up an entry in buffer to receive the data signal. In one embodiment, the buffer may be a data exchange unit, under the control of pointers supplied by the pending data queue. In an embodiment where the requesting agent is part of a bus bridge, this may also include initiating the arbitration process for the secondary bus.

In block 554, the responding agent then sends the corresponding data signal over the bus to the requesting agent. In another embodiment, the responding agent may be configurable to selectively send the data signal at this time, or earlier with the identification signal of block 534. The requesting agent may then place the data from the data signal into the entry of the buffer that was prepared in block 550. In an embodiment where the requesting agent is part of a bus bridge, this may also include sending the data out over the secondary bus. The process then ends.

Figure 6:
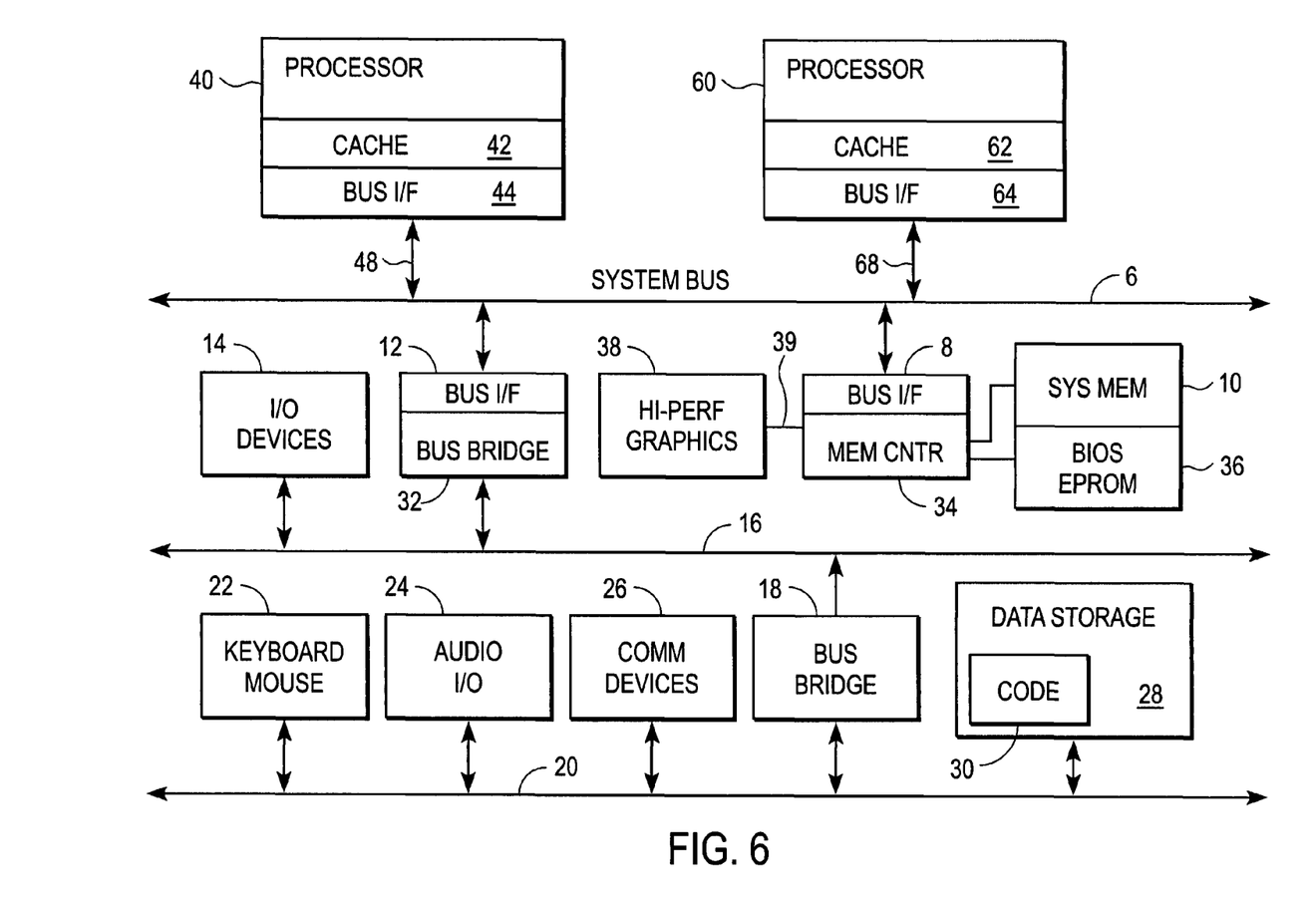
FIG. 6 is a schematic diagram of a system with processors capable of receiving data words after an identification signal, according to an embodiment of the present disclosure.

Referring now to FIG. 6, a schematic diagram of a system with processors capable of receiving data words after an identification signal are shown, according to two embodiments of the present disclosure. The FIG. 6 system generally shows a system where processors, memory, and input/output devices are interconnected by a system bus.

The FIG. 6 system may include one or several processors, of which only two, processors 40, 60 are here shown for clarity. Processors 40, 60 may include level one caches 42, 62. The FIG. 6 system may have several functions connected via bus interfaces 44, 64, 12, 8 with a system bus 6. In one embodiment, system bus 6 may be the front side bus (FSB) utilized with Pentium® class microprocessors manufactured by Intel® Corporation, further modified to the timing between the identification signal and the data message as disclosed in this application. In other embodiments, other busses may be used. In some embodiments memory controller 34 and bus bridge 32 may collectively be referred to as a chipset. In some embodiments, functions of a chipset may be divided among physical chips differently than as shown in the FIG. 6 embodiment.

Memory controller 34 may permit processors 40, 60 to read and write from system memory 10 and from a firmware erasable programmable read-only memory (EPROM) 36. In some embodiments the firmware may present a microcode patch image for loading into a microcode RAM (not shown) of processors 40, 60. In some embodiments firmware EPROM 36 may utilize flash memory. Memory controller 34 may include a bus interface 8 to permit memory read and write data to be carried to and from bus agents on system bus 6. Memory controller 34 may also connect with a high-performance graphics circuit 38 across a high-performance graphics interface 39. In certain embodiments the high-performance graphics interface 39 may be an advanced graphics port AGP interface. Memory controller 34 may direct data from system memory 10 to the high-performance graphics circuit 38 across high-performance graphics interface 39.

In the FIG. 6 system, bus bridge 32 may permit data exchanges between system bus 6 and bus 16, which may in some embodiments be a industry standard architecture (ISA) bus or a peripheral component interconnect (PCI) bus. In the system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28, and in some embodiments software code 30 may include a microcode patch image. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An agent, comprising:
   a first logic to receive from a bus a first deferred reply to a first data request, wherein said first logic receives a first identification signal subsequent to said first deferred reply;
   a second logic to initiate a data receive process responsive to said first identification signal, wherein said second logic receives a first data signal corresponding to said first data request at least one clock of said bus after said first identification signal; and
   a scheduler, coupled to the first logic and second logic, to schedule and track data transfers both to and from the agent, wherein the scheduler is to comprise an in-order queue (IOQ) to store a plurality of entries corresponding to all transactions involving the agent which are in process on the bus.

2. The agent of claim 1, wherein said data signal includes a data strobe.

3. The agent of claim 1, wherein said data signal includes a data word.

4. The agent of claim 1, wherein said data receive process includes arbitrating for the use of a secondary bus.

5. The agent of claim 1, wherein said first logic includes a pending data queue to track servicing of said first data request after receipt of said first deferred reply.

6. The agent of claim 5, wherein said pending data queue issues a control signal to direct the capture of said first data signal in said second logic.

7. The agent of claim 6, wherein said first logic correlates said first data signal to said first identification signal.

8. An agent, comprising:
   a first logic to send over a bus a first deferred reply to a first data request, wherein said first logic sends a first identification signal subsequent to said first deferred reply;
   a second logic to send a first data signal corresponding to said first data request at least one clock of said bus after said first identification signal; and
   a scheduler, coupled to the first logic and second logic, to schedule and track data transfers both to and from the agent, wherein the scheduler is to comprise an in-order queue (IOQ) to store a plurality of entries corresponding to all transactions involving the agent which are in process on the bus.

9. The agent of claim 8, wherein said first data signal includes a data strobe.

10. The agent of claim 8, wherein said first data signal includes a data word.

11. A system, comprising:
    a bus;
    a first agent to send a first data request over said bus;
    a second agent to send over said bus a first deferred reply to said first data request, and further to send a first identification signal subsequent to said first deferred reply, wherein said first agent initiates a data receive process responsive to said first identification signal, and receives a first data signal corresponding to said first data request at least one clock of said bus after said first identification signal; and
    a scheduler, coupled between the first agent and second agent, to schedule and track data transfers both to and from the first agent and second agent, wherein the scheduler is to comprise an in-order queue (IOQ) to store a plurality of entries corresponding to all transactions involving the agent which are in process on the bus.

12. The system of claim 11, wherein said data signal includes a data strobe.

13. The system of claim 11, wherein said data signal includes a data word.

14. The system of claim 11, wherein said data receive process includes arbitrating for the use of a secondary bus.

15. The system of claim 11, wherein said first agent includes a pending data queue to track servicing of said first data request after receipt of said first deferred reply.

16. The system of claim 15, wherein said pending data queue issues a control signal to direct the capture of said first data signal in said first agent.

17. The system of claim 16, wherein said first agent correlates said first data signal to said first identification signal.

18. A method, comprising:
   responding to a data request with a deferred response over a bus;
   sending an identification message over said bus corresponding to said deferred response;
   sending a data signal corresponding to said deferred response on said bus at least one bus clock after said identification message; and
   scheduling and tracking data transfers between agents coupled to the bus, wherein t an in-order queue (IOQ) is to store a plurality of entries corresponding to all transactions involving the agent which are in process on the bus.

19. The method of claim 18, further comprising adding an entry to a pending data queue responsive to receipt of said deferred response.

20. The method of claim 18, further comprising initiating a receive process responsive to receipt of said identification message.

21. The method of claim 20, wherein said initiating includes arbitrating for a secondary bus.

22. The method of claim 18, wherein said data signal includes a data strobe.

23. The method of claim 18, wherein said data signal includes a data word.

24. The method of claim 23, further comprising receiving said data word into a data unit under control of a pending data queue.

* * * * *